Figure 3:
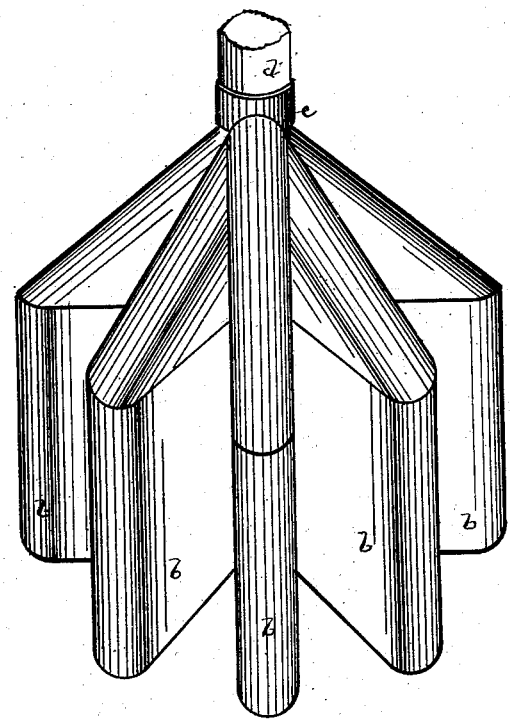

(Model.)
J. G. MÜLLER.
Beer Cooler.
No. 235,554.  2 Sheets—Sheet 1.  Patented Dec. 14, 1880.
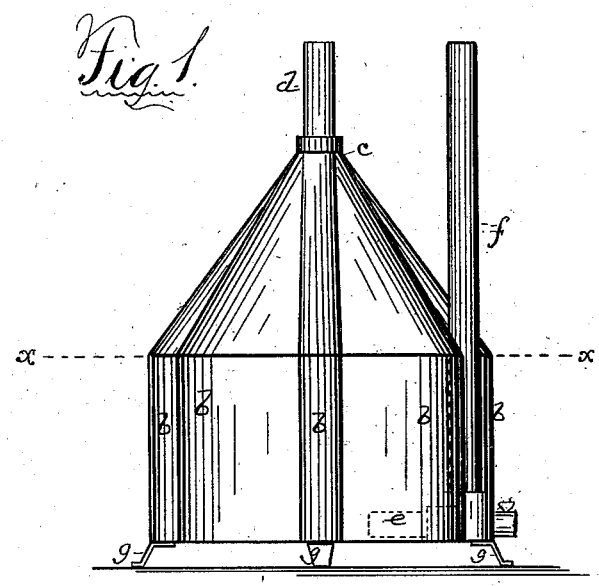
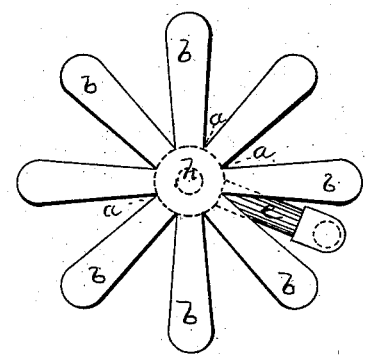

(Model.)

J. G. MÜLLER.
Beer Cooler

No. 235,554.

2 Sheets—Sheet 2.

Patented Dec. 14, 1880.

Witnesses:
T. H. Parsons
J. R. Drake

Jacob G. Müller,
Inventor, by
J. R. Drake,
Atty.

UNITED STATES PATENT OFFICE.

JACOB G. MÜLLER, OF BUFFALO, NEW YORK.

BEER-COOLER.

SPECIFICATION forming part of Letters Patent No. 235,554, dated December 14, 1880.

Application filed June 4, 1880. (Model.)

*To all whom it may concern:*

Be it known that I, JACOB G. MÜLLER, a citizen of the United States, residing at Buffalo, in the county of Erie and State of New York, have invented new and useful Improvements in a Combined Beer-Cooler and Water-Heater, of which the following is a specification.

My invention relates more particularly to a cooler or series of coolers for beer for brewers' use, to be set in tubs or vats of beer and filled with cold water, and also to use the same as water-heaters by filling them with exhaust-steam (also for brewers' use) for heating the water for beer, &c.; and the invention consists in the construction of the cooler or heater by making it of peculiar form or many sided, by which the greatest amount of surface is presented to the beer or water, as hereinafter explained, and illustrated in the accompanying drawings, in which—

Figure 1 is an elevation, and Fig. 2 a longitudinal plan through the cooler in line of $x$, Fig. 1, showing the radial chambers and their connection with the central circular part. Fig. 3 is a perspective of the device without the feed or side pipes, showing the general construction of the device.

The body or central receiving part, $a$, of the receptacle is small and annular in form, and opens on every side into vertical radial wings or chambers $b\ b\ b\ b$, the upper parts of which slant up from about the center of the device to the apex $c$, there forming a mouth, into which is screwed a pipe, $d$, through which exhaust-steam is introduced into the device when used to heat water for brewers or other uses. The slanting tops of the wing-chambers allow the device to be easily withdrawn from the liquid in which it is immersed. Near the bottom is a pipe, $e$, with a cock, by which the condensed steam and water are drawn off.

A vertical pipe, $f$, at the side, is for receiving the water, and connects with pipe $e$. Pipe $f$ will be connected to a pipe leading to the next cooler setting in the next vat or tub, when a series of them are used, one in each tub, or each may be separate, as desired. These, filled with cold water or other cooling stuff or mixture, gradually cool the beer. They stand above the bottom of the tubs on feet $g\ g$, or may be suspended therein. When used for heating, the pipe $f$ is shut off by a plug or cock.

A plate, $h$, is set in the coolers, about the middle of each, when used for heaters with a hole in the center, (see Fig. 2,) and about in line of $x$. (See dotted line.) This plate is to throw out or spread the steam therefrom into the upper part of the wings more thoroughly.

These coolers and heaters are very important in breweries. They are light, though very strongly constructed of metal, and the many sides aid greatly in the cooling or heating process, the object being to present all the surface possible to the liquid to get as thorough and quick action as possible. As heaters they utilize the exhaust-steam for that purpose, which is so much gained.

I claim—

The combined beer-cooler and water-heater constructed with the small annular central vertical receiver, $a$, provided with a series of radial upright hollow projecting chambers, $b\ b\ b\ b$, which slant up from about the center to the apex $c$, and with a central steam-diffusing plate, $h$, and the connecting steam and water pipes $d\ e\ f$, all substantially as specified.

In witness whereof I have hereunto signed my name in the presence of two subscribing witnesses.

JACOB G. MÜLLER.

Witnesses:
J. R. DRAKE,
GEO. A. BURNETT.